(12) United States Patent
Takagi et al.

(10) Patent No.: US 8,828,900 B2
(45) Date of Patent: Sep. 9, 2014

(54) EXHAUST GAS PURIFICATION CATALYST

(75) Inventors: Nobuyuki Takagi, Toyota (JP); Yuichi Sobue, Toyota (JP); Hanae Ikeda, Toyota (JP); Masaya Kamada, Toyota (JP); Ryoichi Inde, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/110,274

(22) PCT Filed: Apr. 6, 2012

(86) PCT No.: PCT/JP2012/059559
§ 371 (c)(1),
(2), (4) Date: Oct. 7, 2013

(87) PCT Pub. No.: WO2012/137937
PCT Pub. Date: Oct. 11, 2012

(65) Prior Publication Data
US 2014/0057776 A1  Feb. 27, 2014

(30) Foreign Application Priority Data

Apr. 8, 2011 (JP) .................. 2011-086552

(51) Int. Cl.
| | | |
|---|---|---|
| B01J 29/00 | (2006.01) | |
| B01J 29/06 | (2006.01) | |
| B01J 21/00 | (2006.01) | |
| B01J 21/04 | (2006.01) | |
| B01J 23/00 | (2006.01) | |
| B01J 23/02 | (2006.01) | |
| B01J 23/08 | (2006.01) | |
| B01J 23/40 | (2006.01) | |
| B01J 23/42 | (2006.01) | |
| B01J 23/44 | (2006.01) | |
| B01J 23/56 | (2006.01) | |
| B01J 20/00 | (2006.01) | |
| B01J 29/74 | (2006.01) | |
| B01J 37/02 | (2006.01) | |
| B01D 53/94 | (2006.01) | |
| F01N 3/08 | (2006.01) | |

(52) U.S. Cl.
CPC B01J 29/74 (2013.01); Y02T 10/22 (2013.01); B01D 2255/2092 (2013.01); B01D 2255/20707 (2013.01); B01J 37/0244 (2013.01); B01D 2255/912 (2013.01); F01N 3/0814 (2013.01); B01D 2255/9022 (2013.01); B01J 23/44 (2013.01); F01N 2510/0684 (2013.01); B01D 53/945 (2013.01); B01J 23/42 (2013.01); B01J 2523/00 (2013.01); B01D 2255/20715 (2013.01); B01D 2255/1023 (2013.01); F01N 3/0835 (2013.01); B01D 2255/1021 (2013.01); Y10S 502/52712 (2013.01); Y10S 502/52713 (2013.01)
USPC ............ 502/66; 502/64; 502/73; 502/74; 502/327; 502/332; 502/333; 502/334; 502/339; 502/349; 502/350; 502/351; 502/355; 502/415; 502/439; 502/527.12; 502/527.13

(58) Field of Classification Search
USPC ......... 502/327, 332, 333, 334, 339, 349–351, 502/355, 415, 439, 527.12, 527.13, 64, 66, 502/73, 74
See application file for complete search history.

(56) References Cited

U.S. PATENT DOCUMENTS

| | | | |
|---|---|---|---|
| 5,177,041 A | | 1/1993 | Horiuchi et al. |
| 5,538,697 A | * | 7/1996 | Abe et al. .................. 422/171 |
| 5,660,800 A | * | 8/1997 | Mieville et al. ............. 422/173 |
| 6,047,544 A | * | 4/2000 | Yamamoto et al. ............ 60/285 |
| 6,093,378 A | * | 7/2000 | Deeba et al. ................ 423/213.5 |
| 6,103,208 A | * | 8/2000 | Ogawa et al. .............. 423/213.2 |
| 6,171,556 B1 | * | 1/2001 | Burk et al. .................. 422/173 |
| 6,893,997 B2 | * | 5/2005 | Matsumoto et al. .......... 502/326 |
| 8,211,392 B2 | * | 7/2012 | Grubert et al. ............. 423/213.2 |
| 8,252,258 B2 | * | 8/2012 | Muller-Stach et al. ..... 423/213.2 |
| 2008/0045405 A1 | | 2/2008 | Beutel et al. |

| | | | |
|---|---|---|---|
| 2008/0317653 | A1* | 12/2008 | Moroz et al. ............... 423/245.1 |
| 2010/0126150 | A1 | 5/2010 | Choi |
| 2011/0107746 | A1* | 5/2011 | Matsumoto et al. ............ 60/297 |

FOREIGN PATENT DOCUMENTS

| | | |
|---|---|---|
| EP | 0 716 677 | 6/1996 |
| EP | 2 374 536 | 10/2011 |
| JP | 04-059049 | 2/1992 |
| JP | 8-224449 | 9/1996 |
| JP | 9-10594 | 1/1997 |
| JP | 09-024274 | 1/1997 |
| JP | 11-138006 | 5/1999 |
| JP | 2002-282688 | 10/2002 |
| JP | 2003-236339 | 8/2003 |
| JP | 2003-290629 | 10/2003 |
| JP | 2010-29814 | 2/2010 |
| JP | 2010-120008 | 6/2010 |
| JP | 2012-206005 | 10/2012 |

* cited by examiner

*Primary Examiner* — Cam N. Nguyen (74) *Attorney, Agent, or Firm* — Finnegan, Henderson, Farabow, Garrett & Dunner, LLP (57) ABSTRACT

The exhaust gas purification catalyst according to the present invention has a substrate 54, a lower layer 57 disposed on this substrate 54, and an upper layer 58 disposed on this lower layer 57. The upper layer 58 is provided with a first catalyst and a second catalyst, and the lower layer 57 is provided with a first catalyst. This first catalyst has $Al_2O_3$ as a carrier and Pt and Pd as noble metals supported on the $Al_2O_3$, while the second catalyst typically has an $Al_2O_3$—$ZrO_2$—$TiO_2$ complex oxide as a carrier and has Pd as a noble metal supported on the $Al_2O_3$—$ZrO_2$—$TiO_2$ complex oxide. Moreover, the upper layer 58 has a hydrocarbon adsorbent 68.

9 Claims, 7 Drawing Sheets

EXHAUST GAS PURIFICATION CATALYST

TECHNICAL FIELD

The present invention relates to an exhaust gas purification catalyst. More particularly, the present invention relates to an exhaust gas purification catalyst suitable for use with diesel engines.

This International application cites priority based on Japanese Patent Application No. 2011-86552 filed on 8 Apr. 2011 and incorporates the contents of that application in their entirety in this Description by reference.

BACKGROUND ART

The exhaust gas discharged from an engine contains, inter alia, hydrocarbon (HC), carbon monoxide (CO), nitrogen oxides (NOx), and particulate matter (PM). In order to purify these exhaust gas components, an exhaust gas purification catalyst is disposed in an automobile, for example, immediately downstream from the engine exhaust manifold.

In general, when the exhaust gas temperature is still low, such as at engine start, the exhaust gas purification catalyst is not adequately warmed up and the purification performance by the catalyst is then reduced. In addition, the low-temperature exhaust gas contains large amounts of CO and HC that is uncombusted material from the fuel. As a consequence, an unsatisfactory purification of the HC and CO by the exhaust gas purification catalyst has been a problem when the exhaust gas resides at low temperatures. HC and CO are converted to $H_2O$ and $CO_2$ by oxidation for discharge. Thus, there is demand for an improved low-temperature activity by exhaust gas purification catalysts, particularly with regard to the oxidative purification performance.

Various attempts have been made to improve the purification performance for HC and CO. As one such attempt, an exhaust gas purification catalyst is known that contains zeolite as a material that adsorbs the HC component.

Patent Literature 1 discloses a diesel oxidation catalyst that contains a first part and a second part: a hydrocarbon trap that adsorbs or desorbs hydrocarbon is coated in the first part, and an oxidation catalyst that oxidizes hydrocarbon and carbon monoxide is coated in the second part. This second part oxidizes HC desorbed from the first part and, utilizing the heat of oxidation produced by this oxidation reaction, desorbs sulfur that has been adsorbed by the oxidation catalyst. This brings about an improved catalyst activity by raising the catalyst bed temperature through the generation of the heat of oxidation utilizing the adsorbed and desorbed HC component.

Other exhaust gas purification catalysts that contain a component that adsorbs the HC component are disclosed in Patent Literature 2 to 7.

CITATION LIST

Patent Literature

Patent Literature 1: Japanese Patent Application Laid-open No. 2010-120008
Patent Literature 2: Japanese Patent Application Laid-open No. H11-138006
Patent Literature 3: Japanese Patent Application Laid-open No. 2003-290629
Patent Literature 4: Japanese Patent Application Laid-open No. H9-10594
Patent Literature 5: Japanese Patent Application Laid-open No. 2003-236339
Patent Literature 6: Japanese Patent Application Laid-open No. 2010-29814
Patent Literature 7: Japanese Patent Application Laid-open No. H8-224449

SUMMARY OF INVENTION

However, conventional exhaust gas purification catalysts still do not exhibit a satisfactory CO purification performance at low temperatures for the exhaust gas from internal combustion engines and particularly for the exhaust gas from diesel engines, and room for improvement still exists.

The present inventors focused on the catalyst contamination that causes an inhibition of CO purification. That is, when HC and CO are present together, a phenomenon can occur in which the activity of the catalyst is reduced due to the catalyst surface being coated by the HC (this is also referred to as "HC poisoning" below). In addition, when a sulfur component, typically a sulfur oxide, is present in the fuel, a phenomenon can occur in which this sulfur component in the exhaust gas can coat the catalyst surface and thereby cause a decline in the catalyst activity (this is also referred to as "sulfur poisoning" below).

The present invention was pursued considering these circumstances with exhaust gas purification catalysts and takes as an object the introduction of an exhaust gas purification catalyst that, based on an inhibition of the aforementioned HC poisoning and sulfur poisoning at the exhaust gas purification catalyst, exhibits an excellent purification performance for carbon monoxide (CO) even under low-temperature conditions.

The present inventors carried out additional investigations from various angles and as a result created the present invention, which can realize the object indicated above.

That is, the herein disclosed exhaust gas purification catalyst is provided with a substrate, a lower layer disposed on this substrate, and an upper layer disposed on this lower layer.

The upper layer is provided with a first catalyst and a second catalyst. The lower layer is provided with a first catalyst.

This first catalyst has $Al_2O_3$ as a carrier and has Pt and Pd supported as noble metal on the $Al_2O_3$. The second catalyst has at least either of an $Al_2O_3$—$ZrO_2$ complex oxide and an $Al_2O_3$—$ZrO_2$—$TiO_2$ complex oxide as a carrier and has Pd supported as noble metal on at least either of the $Al_2O_3$—$ZrO_2$ complex oxide and the $Al_2O_3$—$ZrO_2$—$TiO_2$ complex oxide. In addition, the upper layer is characteristically provided with a hydrocarbon adsorbent.

In the thusly structured exhaust gas purification catalyst, the upper layer, which is the layer that the exhaust gas contacts first, is provided with a hydrocarbon adsorbent. The HC in the exhaust gas is effectively adsorbed by the hydrocarbon adsorbent in this exhaust gas purification catalyst. The amount of HC reaching the lower layer, with which the exhaust gas subsequently comes into contact, is thus significantly lowered and HC poisoning of the catalyst in the lower layer is inhibited.

In addition, the upper layer and the lower layer in the thusly structured exhaust gas purification catalyst both have a first catalyst, that is, have $Al_2O_3$ as a carrier and have Pt and Pd supported as noble metal on this $Al_2O_3$. The first catalyst exhibits a high CO purification performance, particularly in high-temperature regions (for example, at least 180° C.), and as a consequence the thusly structured exhaust gas purification catalyst exhibits an excellent CO purification performance under high-temperature conditions.

The upper layer of the thusly structured exhaust gas purification catalyst also has a second catalyst, that is, has at least either of an $Al_2O_3$—$ZrO_2$ complex oxide (also referred to hereafter as an "AZ complex oxide") and an $Al_2O_3$—$ZrO_2$—$TiO_2$ complex oxide (also referred to hereafter as an "AZT complex oxide") as a carrier and has Pd supported as noble metal on at least either of this AZ complex oxide and AZT complex oxide. The second catalyst exhibits a high CO purification performance in particular in low-temperature regions (for example, below 180° C.) and exhibits a relatively high resistance to sulfur poisoning in low-temperature regions. As a consequence, the thusly structured exhaust gas purification catalyst displays a high CO purification performance under low-temperature conditions—even when sulfur components are present in the exhaust gas in relatively high concentrations.

In a preferred embodiment of the herein disclosed exhaust gas purification catalyst, the loading rate for the Pd in the second catalyst is characteristically not more than 2.5 mass % when the carrier of at least either of an $Al_2O_3$—$ZrO_2$ complex oxide and an $Al_2O_3$—$ZrO_2$—$TiO_2$ complex oxide is at 100 mass %.

The low-temperature activity of the CO purification function of the second catalyst is improved when the loading rate by the Pd in the second catalyst is not more than 2.5 mass % (for example, from at least 0.05 mass % to not more than 2.5 mass %, preferably from at least 0.5 mass % to not more than 1.5 mass %, and more preferably from at least 0.8 mass % to not more than 1.3 mass %). As a consequence, the thusly structured exhaust gas purification catalyst exhibits an even better CO purification performance under low-temperature conditions (for example, less than 180° C.).

In another preferred embodiment of the herein disclosed exhaust gas purification catalyst, for the upper layer the content of the first catalyst is characteristically from at least 30 mass % to not more than 99 mass % when the total of the first catalyst and the second catalyst is 100 mass %.

The thusly structured exhaust gas purification catalyst—in both high-temperature (for example, at least 180° C.) and low-temperature (for example, less than 180° C.) regions—is stable, exhibits a high resistance to sulfur poisoning, and exhibits a high CO purification performance.

The lower layer is additionally characteristically provided with the second catalyst in another preferred embodiment of the herein disclosed exhaust gas purification catalyst.

The thusly structured exhaust gas purification catalyst exhibits an improved heat resistance for the catalyst itself and exhibits a high CO purification performance even after thermal challenge. In addition, the thusly structured exhaust gas purification catalyst exhibits an even greater improvement in the resistance to sulfur poisoning.

In another preferred embodiment of the herein disclosed exhaust gas purification catalyst, for the lower layer the content of the first catalyst is characteristically from at least 30 mass % to not more than 99 mass % when the total of the first catalyst and the second catalyst is 100 mass %.

In both high-temperature and low-temperature regions the thusly structured exhaust gas purification catalyst is stable, exhibits a high resistance to sulfur poisoning, and exhibits a high CO purification performance.

The lower layer is additionally characteristically provided with a hydrocarbon adsorbent in another preferred embodiment of the herein disclosed exhaust gas purification catalyst.

In the thusly structured exhaust gas purification catalyst, HC that has reached the lower layer without being adsorbed in the upper layer can be trapped by this hydrocarbon adsorbent in the lower layer and as a result the HC poisoning of the catalyst in the lower catalyst can be inhibited still further.

The average particle size of the noble metal supported in the second catalyst is characteristically not more than 5 nm in another preferred embodiment of the herein disclosed exhaust gas purification catalyst.

The CO purification performance under low-temperature conditions is improved in the thusly structured exhaust gas purification catalyst.

Zeolite particles are characteristically provided as the hydrocarbon adsorbent in another preferred embodiment of the herein disclosed exhaust gas purification catalyst.

Zeolite particles have a high selectivity for the adsorbate and as a consequence an efficient adsorption of various HC components (for example, lower olefins having not more than 6 carbon atoms, higher hydrocarbons having 7 or more carbons, and so forth) can be brought about with the thusly structured exhaust gas purification catalyst.

The exhaust gas purification catalyst is characteristically used for the purification of exhaust gas from a diesel engine in another preferred embodiment of the herein disclosed exhaust gas purification catalyst.

The exhaust gas discharged from a diesel engine tends to have a lower temperature than the exhaust gas discharged from a gasoline engine. In addition, the light oil used in diesel engines has at least 15 carbons (typically about 15 to 17) and thus is a higher hydrocarbon that is larger than in the gasoline (about 4 to 10 carbons) used in gasoline engines. As a consequence, the effect (HC poisoning) due to the binding of uncombusted diesel fuel components to a catalyst tends to be larger than the effect induced by uncombusted gasoline components.

Moreover, fuels that at the same time have a relatively high sulfur concentration are also often used in regions where diesel engines are widely used.

The herein disclosed exhaust gas purification catalyst, because it has an excellent low-temperature activity with regard to CO purification and because HC poisoning and sulfur poisoning of this catalyst can be suppressed, is particularly well suited as an exhaust gas purification catalyst for the purification of the exhaust gas from diesel engines.

DESCRIPTION OF EMBODIMENTS

Preferred exemplary embodiments of the present invention are described in the following. Matters required for the execution of the present invention, but not included in the matters particularly described in this Description, can be understood as design matters for the individual skilled in the art based on the conventional art in the pertinent field. The present invention can be executed based on the contents of this Description and the common general technical knowledge in the pertinent field.

The herein disclosed exhaust gas purification catalyst and an embodiment of an exhaust gas purification apparatus that is equipped with this exhaust gas purification catalyst will be described with reference to the drawings. The detailed description here concerns an example in which a diesel engine is used as the internal combustion engine, but this should not be taken to imply that the scope of application of the present invention is limited to diesel engines. The present invention can be applied to, for example, gasoline engines.

Figure 1:
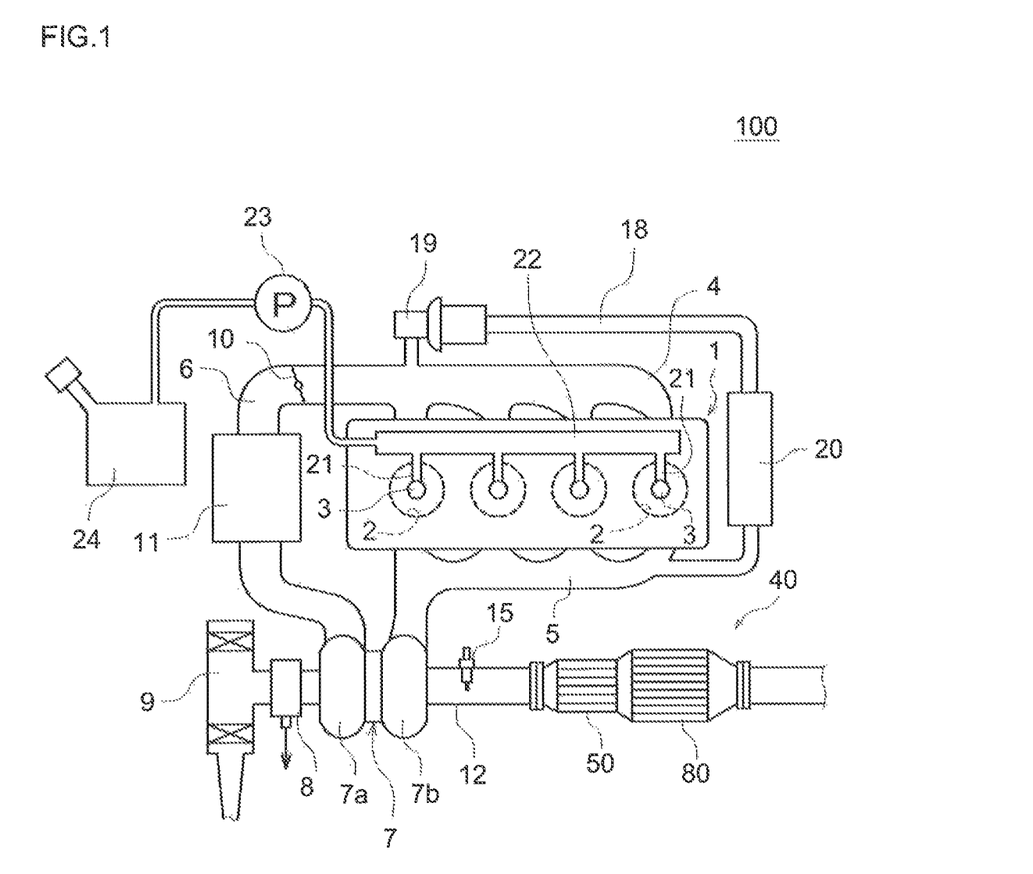
FIG. 1 is a schematic diagram of an exhaust gas purification apparatus according to an embodiment.
Figure 2:
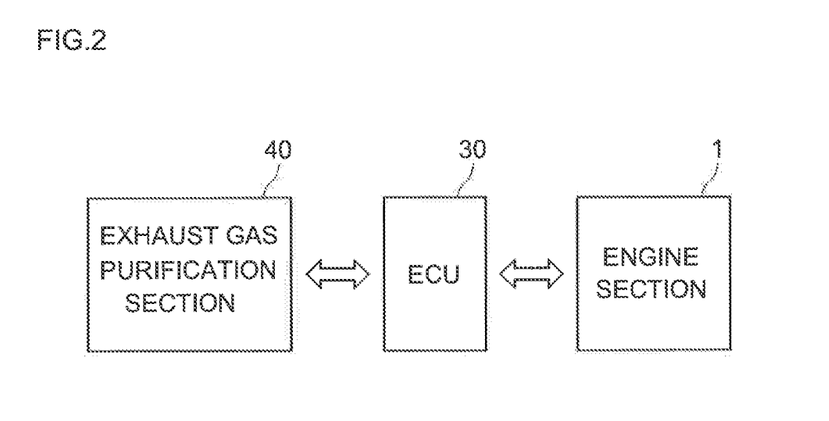
FIG. 2 is a diagram that schematically describes the structure of the control section in an exhaust gas purification apparatus according to an embodiment.

As shown in FIGS. 1 and 2, the exhaust gas purification apparatus 100 according to this embodiment is, broadly speaking, constituted of an engine section 1 that is composed mainly of a diesel engine (the engine section 1 includes an accelerator and other operating systems for operating the engine), an exhaust gas purification section 40 that is disposed in an exhaust system that communicates with the engine section 1, and an electronic control unit (ECU) 30 that exercises control between the exhaust gas purification section 40 and the engine section 1.

The engine section 1 is typically provided with a plurality of combustion chambers 2 and with fuel injection valves 3 that inject fuel into the individual combustion chambers 2. Each combustion chamber 2 communicates with an intake manifold 4 and an exhaust manifold 5. The intake manifold 4 is connected through an intake duct 6 to the outlet of a compressor 7a of an exhaust turbocharger 7. The inlet to the compressor 7a is connected through an intake air flow detector 8 to an air cleaner 9. A throttle valve 10 is disposed in the intake duct 6. A cooler 11 is disposed on the periphery of the intake duct 6 in order to cool the air flowing in the intake duct 6. The exhaust manifold 5 is connected to the inlet of an exhaust turbine 7b of the exhaust turbocharger 7. The outlet of the exhaust turbine 7b is connected to an exhaust line 12.

The exhaust manifold 5 and the intake manifold 4 are connected to each other through an exhaust gas recirculation (abbreviated as EGR in the following) conduit 18. An electronically-controlled control valve 19 is disposed in the EGR conduit 18. In addition, a cooler 20 is disposed on the periphery of the EGR conduit 18 in order to cool the EGR gas flowing within the EGR conduit 18.

Each fuel injection valve 3 is connected through a fuel supply line 21 to a common rail 22. The common rail 22 is connected through a fuel pump 23 to a fuel tank 24. In the present case, the fuel pump 23 is a variable-discharge electronically-controlled fuel pump. This should not be taken to imply that there are particular limitations on the fuel pump 23.

A fuel supply valve 15 that supplies (injects) fuel into the exhaust gas is disposed in the exhaust line 12, and the exhaust gas purification section 40 is disposed downstream therefrom. The exhaust gas purification section 40 is provided with an exhaust gas purification catalyst 50 for oxidizing the CO and HC in the exhaust gas and with a particulate filter 80 that collects the particulate matter (PM) in the exhaust gas.

As shown in FIG. 2, the ECU 30 is a unit that exercises control between the engine section 1 and the exhaust gas purification section 40 and comprises a digital computer. The ECU 30 has a read-only memory (ROM), a random access memory (RAM), a microprocessor (CPU), an input port, and an output port that are interconnected by a bidirectional bus.

A load sensor is connected to an accelerator pedal (not shown), and this load sensor generates an output voltage in proportion to the amount of depression of the accelerator pedal. The output voltage from the load sensor is input through a corresponding AD converter to the input port. Also connected to the input port is a crank angle sensor that generates an output pulse each time the crankshaft rotates through a prescribed angle (for example, 15°).

The output signals from a temperature sensor and a differential pressure sensor in the exhaust gas purification section 40 are input through respective corresponding AD converters to the input port. On the other hand, the output port is connected via the corresponding operating circuits to the fuel injection valves 3, a step motor for operating the throttle valve 10, the control valve 19, the fuel pump 23, and the fuel supply valve 15. This enables control of the fuel injection valves 3, the fuel supply valve 15, and so forth by the ECU 30.

The control system described about is not itself a characteristic feature of the present invention, and the control systems heretofore used with this type of internal combustion engine (automotive engines) may be used and the particular details beyond those given above are therefore omitted.

The exhaust gas purification catalyst 50 that is provided in the exhaust gas purification section 40 and that is a characteristic feature of the present invention will now be described.

The various materials and the various configurations heretofore used in this type of service can be used for the substrate comprising the herein disclosed exhaust gas purification catalyst. For example, a honeycomb substrate having a honeycomb structure formed from a highly heat-resistant ceramic, e.g., cordierite or silicon carbide (SiC), or alloy, e.g., stainless steel, can be suitably used. One example is a honeycomb substrate having a cylindrical external shape and having through passages (cells) disposed as exhaust gas passages along its cylindrical axis whereby the exhaust gas can come into contact with the walls (rib walls) that define the individual cells. The substrate may have a shape other than a honeycomb shape, for example, a foam shape or a pellet configuration. Moreover, besides a cylindrical shape, an oval shape or a polygonal shape may be used for the external shape of the substrate as a whole.

Figure 3:
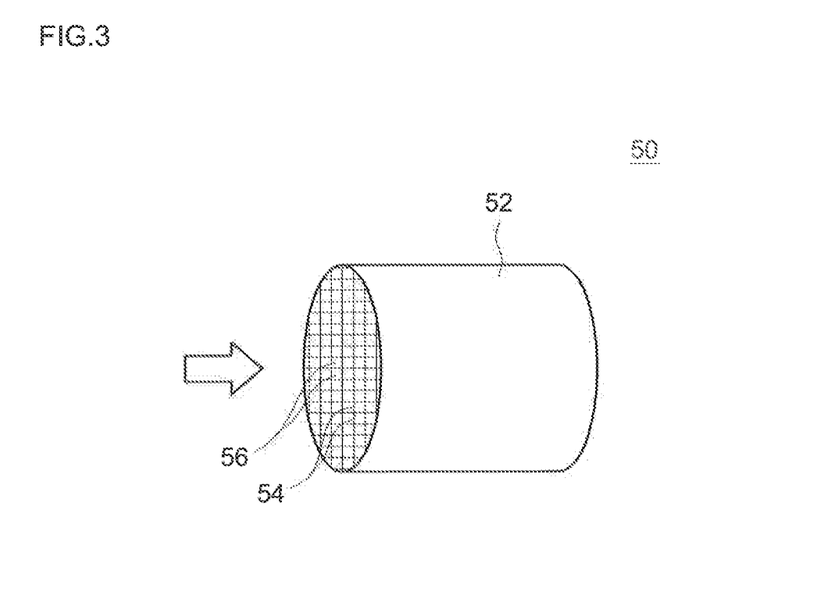
FIG. 3 is a general view of the exhaust gas purification catalyst according to an embodiment.

FIG. 3 is a schematic diagram of the exhaust gas purification catalyst according to an embodiment. Thus, the exhaust gas purification catalyst 50 of this embodiment has a honeycomb substrate 52, a plurality of regularly arrayed cells 56, and a rib wall (also referred to as "substrate" in the following) 54 constituting the cell 56.

Figure 4:
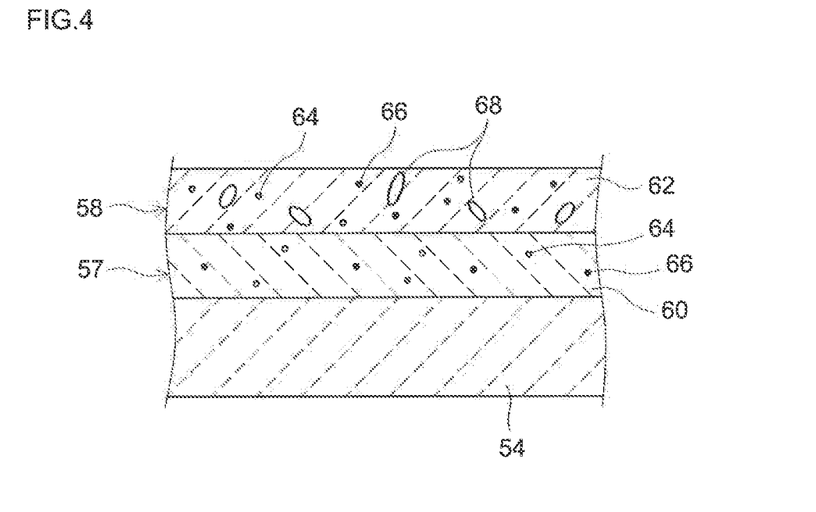
FIG. 4 is a diagram that shows the structure, in enlarged view, of the rib wall region in the exhaust gas purification catalyst of FIG. 3.

FIG. 4 is a diagram that describes the structure, in an enlarged view, of the surface region of the rib wall (substrate) 54 in the exhaust gas purification catalyst 50 in the embodiment of FIG. 3. Thus, the exhaust gas purification catalyst 50 according to this embodiment has a substrate 54, a lower layer 57 disposed on this substrate 54, and an upper layer 58 disposed on this lower layer 57. The lower layer 57 has a lower layer carrier 60 and a Pt particle 64 and a Pd particle 66 as noble metal. The upper layer 58 has an upper layer carrier 62, a Pt particle 64 and a Pd particle 66 as noble metal, and a hydrocarbon adsorbent 68.

Figure 5:
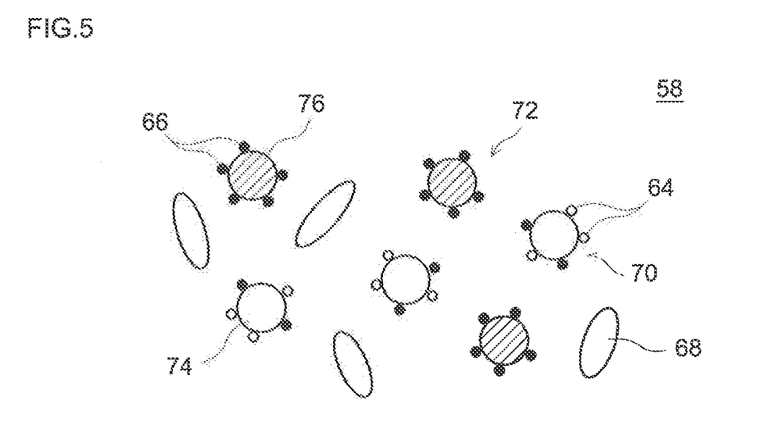
FIG. 5 is a diagram that schematically describes the structure of the upper layer region in FIG. 4.

FIG. 5 is a schematic diagram that describes, in enlarged view, the structure of the upper layer 58 in the embodiment of FIG. 4. This upper layer 58 is provided with a first catalyst 70, a second catalyst 72, and the hydrocarbon adsorbent 68. The first catalyst 70 here is provided with alumina ($Al_2O_3$) 74 as a carrier and with the Pt particle 64 and the Pd particle 66 supported on this carrier 74. The second catalyst 72 has at least either of an AZ complex oxide and an AZT complex oxide as a carrier (typically an AZT complex oxide 76) and a Pd particle 66 supported on this carrier 76.

Figure 6:
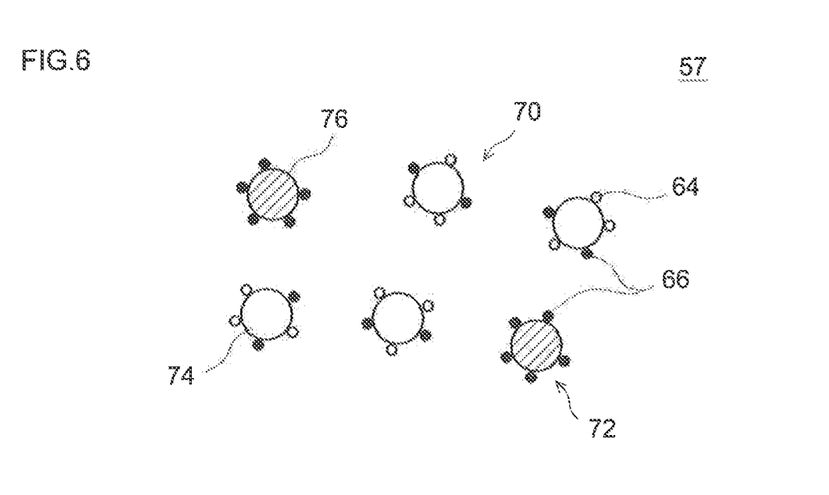
FIG. 6 is a diagram that schematically describes the structure of the lower layer region in FIG. 4.

FIG. 6 is a schematic diagram that describes, in enlarged view, the structure of the lower layer 57 in the embodiment in FIG. 4. This lower layer 57 is provided with at least the first catalyst 70 and is preferably additionally provided with the second catalyst 72. The carriers and noble metals constituting the first catalyst 70 and the second catalyst 72 are the same as for the upper layer 58 described above. Thus, the first catalyst 70 is provided with alumina ($Al_2O_3$) 74 as a carrier and with the Pt particle 64 and the Pd particle 66 supported on this carrier 74. The second catalyst 72 has at least either of an AZ complex oxide and an AZT complex oxide as a carrier (typically an AZT complex oxide 76) and has the Pd particle 66 supported on this carrier 76.

The aforementioned $Al_2O_3$ 74 and the aforementioned AZ complex oxide or AZT complex oxide 76 are suitably used as the carriers for the first catalyst 70 and the second catalyst 72 constituting the herein disclosed exhaust gas purification catalyst 50.

The method of producing this AZ complex oxide and the AZT complex oxide 76 is not particularly limited and they may be produced, for example, by a coprecipitation method, a sol-gel method, or a hydrothermal synthesis. The production of the AZT complex oxide 76 by a typical coprecipitation method proceeds as follows. Thus, the pH of a mixed aqueous solution comprising the water-soluble salts (for example, the nitrates) of aluminum, zirconium, and titanium, after the optional admixture of a surfactant, may be gradually raised by adding aqueous ammonia as a base in order to produce a coprecipitate and the complex oxide may then be obtained by subjecting this coprecipitate to a heat treatment.

The herein disclosed exhaust gas purification catalyst 50 contains the Pt particle 64 and the Pd particle 66 as noble metal. Besides the Pt particle 64 and the Pd particle 66, this exhaust gas purification catalyst 50 may be provided with particles of, for example, rhodium (Rh), ruthenium (Ru), osmium (Os), iridium (Ir), and silver (Ag) as the noble metal. These noble metals may be used in alloy form.

This noble metal (typically the Pt particle 64 and the Pd particle 66 and particularly the Pd particle 66 supported on the AZ complex oxide or the AZT complex oxide 76) preferably has a sufficiently small particle diameter viewed from the standpoint of increasing the area of contact with the exhaust gas and from the standpoint of the interaction with the carrier. Typically the average particle diameter of the noble metal is in all instances preferably about from 1 to 15 nm and, when viewed from the standpoint of improving the low-temperature activity in the CO purification performance of the exhaust gas purification catalyst 50, is more preferably not more than 5 nm and even more preferably is not more than 4 nm or not more than 3 nm.

The first catalyst 70 constituting the herein disclosed exhaust gas purification catalyst 50 is provided with a Pt particle 64 and a Pd particle 66 as noble metal. The proportion of the Pd particle 66 as the mass ratio is desirably from at least 0.2 to not more than 0.8 (preferably from at least 0.25 to not more than 0.6 and more preferably from at least 0.3 to not more than 0.5) where 100 mass % is the noble metal in the first catalyst 70. A Pd particle 66 proportion in the noble metal in the first catalyst 70 smaller or larger than this range may cause a decline in the CO purification performance of the exhaust gas purification catalyst.

The second catalyst 72 constituting the herein disclosed exhaust gas purification catalyst 50 is provided with a Pd particle 66 as noble metal. The loading rate for the Pd particle 66 is preferably not more than 2.5 mass % (for example, from at least 0.05 mass % to not more than 2.5 mass % and preferably from at least 0.5 mass % to not more than 1.5 mass % and more preferably from at least 0.8 mass % to not more than 1.3 mass %) where 100 mass % is the carrier (typically the AZT complex oxide 76) for the second catalyst 72. It is difficult to obtain a catalytic effect due to the noble metal when the loading rate for the Pd particle 66 in the second catalyst 72 is smaller than this range. In addition, when the loading rate for the Pd particle 66 in the second catalyst 72 is larger than this range, grain growth by the noble metal may progress and a cost disadvantage is also incurred.

With regard to the mixing proportions of the first catalyst 70 and the second catalyst 72 for the upper layer 58 and the lower layer 57, the content of the first catalyst 70 is desirably from at least 30 mass % to not more than 99 mass % (preferably from at least 35 mass % to not more than 70 mass %, more preferably from at least 40 mass % to not more than 60 mass %, and even more preferably from at least 45 mass % to not more than 55 mass %) where 100 mass % is the total of the first catalyst 70 and the second catalyst 72. When the content of the first catalyst 70 is smaller than this range, a declining trend appears for the CO purification performance under high-temperature conditions (for example, at and above 180° C.). The CO purification performance under low-temperature conditions may decline when this content is larger than this range.

The upper layer 58 constituting the herein disclosed exhaust gas purification catalyst 50 contains a hydrocarbon adsorbent 68. The hydrocarbon adsorbent 68 referenced in this Description refers to a material that has a porous structure and that adsorbs hydrocarbon within this porous structure.

This hydrocarbon adsorbent 68 can be exemplified by zeolites, for example, a zeolite selected from the group consisting of zeolite A, ferrierite-type zeolites, zeolite ZSM-5, mordenite-type zeolites, zeolite β, zeolite X, zeolite Y, and their combinations. The particulate form can be suitably used.

The herein disclosed exhaust gas purification catalyst 50 is formed into a layer structure having an upper layer and a lower layer. In order to produce this layer structure, the lower layer 57 is formed by washcoating a slurry containing at least the first catalyst 70 on the surface of the substrate 54 and the upper layer 58 is formed by washcoating the surface of the lower layer 57 with a slurry that contains at least the first catalyst 70, the second catalyst 72, and the hydrocarbon adsorbent 68. In order to properly bind the slurry to the surface of the substrate 54 or the surface of the lower layer 57, a binder is preferably incorporated in the slurry in the process of forming the catalyst layers by washcoating. For example, an alumina sol, a silica sol, and so forth, may be used as the binder. The slurry should have a viscosity that enables the slurry to readily flow into the cell 56 of the honeycomb substrate 52.

The baking conditions for the slurry washcoated on the surface of the substrate 54 or the lower layer 57 will depend on the shape and dimensions of the substrate 54 or the carrier, but are typically about 1 to 4 hours at about 400 to 1000° C. (for example, 500 to 600° C.).

The upper layer 58 constituting the herein disclosed exhaust gas purification catalyst 50 may have a freely selected thickness, but is preferably from at least 30 μm to not more than 100 μm and more preferably is from at least 40 μm to not more than 70 μm or not more than 60 μm (here and below, this thickness refers to the average thickness).

The average layer thickness in this Description can be obtained by sectioning the substrate at positions that are 35 mm from the face on the inflow side and the face on the outflow side, respectively; measuring the layer thickness at a corner and a side for four randomly selected cells at each face (total of 16 locations); and calculating the average value from the measured values. Below, the layer thickness in this Description refers to the layer thickness obtained by this measurement method.

When the thickness of the upper layer 58 is thinner than the range indicated above, and when, as at engine start up, the exhaust gas resides at a low temperature and the HC component is present in the exhaust gas in relatively large amounts, the HC can then pass through the upper layer 58 and reach the lower layer 57 and can bind to the catalyst in the lower layer 57 to cause a reduction in the catalytic activity. In addition, when the upper layer 58 is thicker than the range indicated above, the exhaust gas components to be purified, e.g., carbon monoxide and so forth, may not reach the lower layer 57 to a satisfactory extent depending upon diffusion.

The total thickness of the upper layer 58 and the lower layer 57 in the herein disclosed exhaust gas purification catalyst 50 may be freely established, but is preferably from at least 100 μm to not more than 250 μm and more preferably is from at least 150 μm to not more than 250 μm (as the average thickness as above; this also applies in the following).

When the total thickness of the upper layer 58 and the lower layer 57 is thinner than the range given above, the absolute amount of noble metal in the exhaust gas purification catalyst 50 is inadequate and it may then not be possible to achieve a satisfactory purification of the exhaust gas. When this thickness is greater than the range given above, the exhaust gas may not permeate throughout the entire exhaust gas purification catalyst 50 and it may then not be possible to efficiently utilize the noble metal supported on the carrier. In addition, this may cause a rise in the pressure loss during the passage of the exhaust gas through the cell 56 in the exhaust gas purification catalyst 50.

As long as the layer structure described in the preceding has a catalyst layer as described above as an upper layer 58 and a catalyst layer as described above as a lower layer 57, this layer structure may have three or more layers and may contain another layer or layers in addition to these two layers (for example, a separate layer in proximity to the substrate 54).

Examples relating to the present invention are described in the following, but this should not be taken to imply that the present invention is limited by or to the examples specifically shown here.

<Carrier: Production of an $Al_2O_3$—$ZrO_2$—$TiO_2$ Complex Oxide Powder>

An $Al_2O_3$—$ZrO_2$—$TiO_2$ (AZT) complex oxide was produced by the following process. Thus, an aqueous aluminum nitrate solution (aqueous solution 1) was prepared by dissolving aluminum nitrate in pure water. Then, a mixed solution (aqueous solution 2) was prepared by dissolving zirconium oxynitrate and titanium tetrachloride in pure water. An aqueous ammonia solution (aqueous solution 3) was prepared that contained 1.2-times the amount of ammonia required to neutralize these two solutions, i.e., aqueous solution 1 and aqueous solution 2. Aqueous solution 1 was first added to aqueous solution 3 while stirring and aqueous solution 2 was then introduced and stirring was carried out for at least 1 hour to obtain a precipitate. This precipitate was dried by heating for 12 hours at 150° C. and was then baked for 5 hours at 600° C. to obtain an AZT complex oxide powder. The component ratio in this powder was $Al_2O_3$:$ZrO_2$:$TiO_2$=60:28:12 as the mass ratio.

<Carrier: Preparation of an $Al_2O_3$ Powder>

An $Al_2O_3$ powder was prepared by the same production process as for the production process given above for the AZT complex oxide, but using aluminum nitrate instead of using the zirconium oxynitrate and titanium tetrachloride starting materials.

Production of Exhaust Gas Purification Catalysts According to Reference Examples Reference Examples 1 to 3

Exhaust gas purification catalysts were prepared in which Pt particles and/or Pd particles were supported on the AZT complex oxide powder described above.

Specifically, a dinitrodiammineplatinum nitrate solution adjusted to a suitable concentration and/or an aqueous palladium nitrate solution adjusted to a suitable concentration and a suitable amount of pure water were mixed into the above-described AZT complex oxide powder as carrier and this was stirred for 2 hours. Drying at 130° C. and baking for 1 hour at 500° C. then produced an exhaust gas purification catalyst in the form of the AZT complex oxide supporting Pt particles and/or Pd particles. The amount of supported Pt particles and/or Pd particles was adjusted during this process as shown in Table 1, where 100 mass % is the carrier.

The obtained noble metal particle-loaded powders were molded into pellet form using a press to give the exhaust gas purification catalysts according to Reference Examples 1 to 3.

TABLE 1

| | carrier | Pt (mass %) | Pd (mass %) |
|---|---|---|---|
| Reference Example 1 | AZT | 1 | 0.5 |
| Reference Example 2 | AZT | 0 | 1.5 |
| Reference Example 3 | AZT | 1.5 | 0 |
| Reference Example 4 | $Al_2O_3$ | 1 | 0.5 |
| Reference Example 5 | $Al_2O_3$ | 0 | 1.5 |
| Reference Example 6 | $Al_2O_3$ | 1.5 | 0 |
| Reference Example 7 | AZT | 0 | 3.0 |
| Reference Example 8 | AZT | 0 | 5.0 |
| Reference Example 9 | AZT | 0 | 0.5 |
| Reference Example 10 | $Al_2O_3$ AZT | 1.0 | 1.0 |

Reference Examples 4 to 6

Exhaust gas purification catalysts were prepared in which Pt particles and/or Pd particles were supported on the $Al_2O_3$ powder described above.

Specifically, the preparation was carried out as for the preparation process in Reference Examples 1 to 3, with the exception that the $Al_2O_3$ powder described above was used as the carrier in place of the AZT complex oxide powder. The amount of supported Pt particles and/or Pd particles was adjusted during this process as shown in Table 1, where 100 mass % is the carrier.

The obtained noble metal particle-loaded powders were molded into pellet form using a press to give the exhaust gas purification catalysts according to Reference Examples 4 to 6.

<Thermal Challenge of the Reference Example Exhaust Gas Purification Catalysts>

A thermal challenge was run on the total of six species of exhaust gas purification catalysts according to Reference Examples 1 to 6. Specifically, the exhaust gas purification catalysts according to Reference Examples 1 to 6 were heated for 5 hours at 750° C. in the air.

<Sulfur Poisoning of the Reference Example Exhaust Gas Purification Catalysts>

After this thermal challenge, sulfur poisoning by contact with a sulfur-containing gas was carried out on the exhaust gas purification catalysts according to Reference Examples 1 to 6.

Specifically, after the indicated thermal challenge, the exhaust gas purification catalysts according to Reference Examples 1 to 6 were placed in an evaluation instrument and a gas with the gas composition shown in Table 2 was introduced with the incoming gas temperature set to 400° C. The gas flow rate here was set to 15 L/min. This sulfur-poisoning treatment was run until the amount of sulfur passed through the evaluation instrument reached 5 g per 1 L of catalyst.

TABLE 2

| gas composition | $CO/C_3H_6/NO/O_2/CO_2/SO_2$ = 1500 ppm/ 1000 ppmC/200 ppm/10%/10%/100 ppm (balance gas = $N_2$) |
|---|---|
| gas flow rate | 15 L/min |

<Activity Evaluation>

The exhaust gas purification catalysts according to Reference Examples 1 to 6 were evaluated for their activity with respect to carbon monoxide (CO).

Specifically, 1 g of the exhaust gas purification catalyst was weighed out and placed in the evaluation instrument. Then, while raising the temperature of the exhaust gas purification catalyst from 65° C. at a rate of temperature rise of 20° C./min, a gas with the composition shown in Table 3 was introduced at a gas flow rate of 15 L/min and the carbon monoxide (CO) concentration at the outlet was measured. During this sequence, the temperature for a 5 mol % decrement due to purification (5% CO purification temperature (° C.)) from the CO concentration at gas introduction and the temperature for an 80 mol % decrement due to purification (80% CO purification temperature (° C.)) from the CO concentration at gas introduction were determined.

TABLE 3

| gas composition | $CO/C_3H_6/NO/O_2/CO_2/H_2O$ = 1500 ppm/ 1000 ppmC/200 ppm/10%/10%/3% (balance gas = $N_2$) |
|---|---|
| gas flow rate | 15 L/min |
| rate of temperature rise | 20° C./min |

Figure 7:
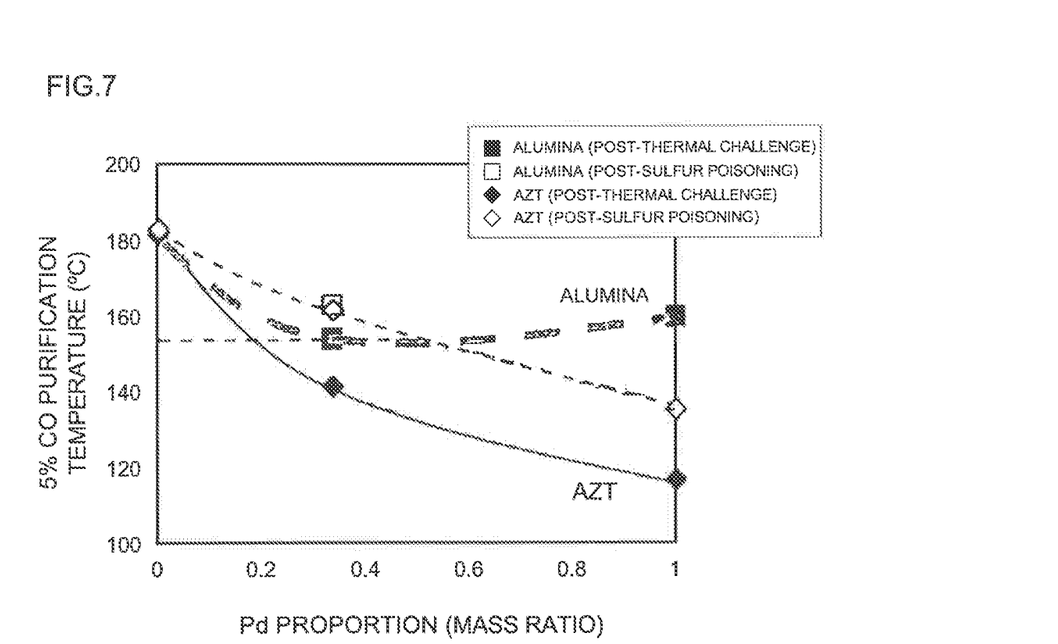
FIG. 7 is a diagram that shows the relationship between the Pd proportion and the low-temperature activity for CO purification, before and after a sulfur poisoning treatment, for exhaust gas purification catalysts according to reference examples (vertical axis: 5% CO purification temperature (° C.), horizontal axis:Pd proportion (mass ratio))
Figure 8:
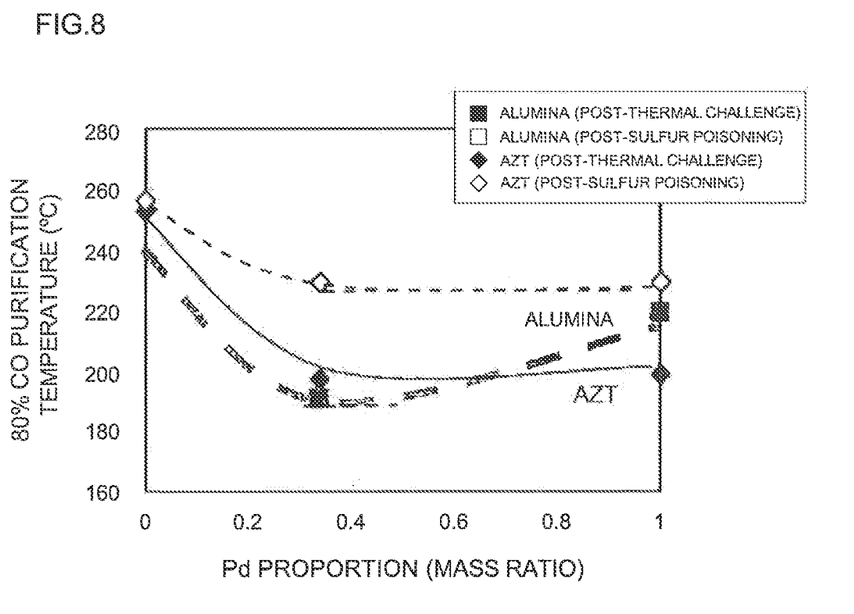
FIG. 8 is a diagram that shows the relationship between the Pd proportion and the high-temperature activity for CO purification, before and after a sulfur poisoning treatment, for exhaust gas purification catalysts according to reference examples (vertical axis: 80% CO purification temperature (° C.), horizontal axis:Pd proportion (mass ratio))

The results of these activity evaluations are given in FIGS. 7 and 8. As is clear from FIG. 7, when the exhaust gas purification catalysts of Reference Examples 1 to 6 post-thermal challenge are compared, the exhaust gas purification catalysts that used the AZT complex oxide powder for the carrier (Reference Examples 1 to 3) were seen to generally have a better low-temperature activity for CO purification than the exhaust gas purification catalysts that used the $Al_2O_3$ powder for the carrier (Reference Examples 4 to 6). Among Reference Examples 1 to 3 post-thermal challenge, the exhaust gas purification catalyst according to Reference Example 2, in which the Pd proportion was 1 (i.e., only Pd particles were supported for the noble metal particles), exhibited the best low-temperature activity for CO purification.

In addition, after the sulfur poisoning treatment, the exhaust gas purification catalyst according to Reference Example 2 presented a low-temperature activity for CO purification that was diminished from that exhibited by the exhaust gas purification catalyst before the sulfur poisoning treatment (i.e., after the thermal challenge). However, the exhaust gas purification catalyst according to Reference Example 2 post-sulfur poisoning is still seen to have a higher low-temperature activity than the exhaust gas purification catalysts that used $Al_2O_3$ for the carrier (Reference Examples 4 to 6).

That is, the exhaust gas purification catalyst of Pd particles supported on an AZT complex oxide carrier (i.e., the second catalyst) was confirmed to have a high low-temperature activity for CO purification. This catalyst was also confirmed to have a relatively high resistance to sulfur poisoning under low-temperature conditions.

On the other hand, as is clear from FIG. 8, when the exhaust gas purification catalysts of Reference Examples 1 to 6 post-thermal challenge were compared in the high-temperature region (for example, at least 180° C.), really large differences in the CO purification performance were not seen. Thus, the exhaust gas purification catalysts that used $Al_2O_3$ powder for the carrier (Reference Examples 4 to 6) exhibited the same high CO purification performance as the exhaust gas purification catalysts that used the AZT complex oxide powder for the carrier (Reference Examples 1 to 3).

In addition, a comparison of the exhaust gas purification catalysts according to Reference Examples 1 to 3 post-sulfur poisoning with the exhaust gas purification catalysts according to Reference Examples 1 to 3 prior to sulfur poisoning (i.e., after the thermal challenge) demonstrated that post-sulfur poisoning these catalysts had a significantly diminished CO purification performance in the high-temperature region. That is, in the high-temperature region (for example, at least 180° C.), the exhaust gas purification catalysts in which Pd particles and/or Pt particles were supported on an AZT complex oxide carrier were strongly influenced by sulfur poisoning and a decline in the CO purification performance was demonstrated.

These results demonstrate the usefulness—due to the manifestation of a stable CO purification performance, even upon exposure to sulfur, over both temperature regions, i.e., the low-temperature region and the high-temperature region—of a catalyst in which a catalyst of Pd particles supported on an AZT complex oxide carrier (the second catalyst) and a catalyst of Pt particles and Pd particles supported on an $Al_2O_3$ carrier (the first catalyst) are mixed in suitable mixing proportions.

<The Amount of Supported Noble Metal Particles>

The CO purification performance at different amounts of supported Pd particles was examined for the catalyst of Pd particles supported on the previously described AZT complex oxide carrier (the second catalyst).

Specifically, exhaust gas purification catalysts were produced by the same production process as in Reference Examples 1 to 3, using 1.5 mass % (i.e., Reference Example 2), 3.0 mass % (Reference Example 7), and 5.0 mass % (Reference Example 8) for the Pd particle loading rate where 100 mass % is the AZT complex oxide used as the carrier. For comparison, the exhaust gas purification catalyst according to Reference Example 4 was produced, which used $Al_2O_3$ for the carrier with Pt particles and Pd particles supported thereon.

The previously described thermal challenge was run on this total of 4 species of exhaust gas purification catalysts (Reference Examples 2, 4, 7, and 8) followed by execution of the previously described activity evaluation. The results are shown in FIG. 9.

Figure 9:
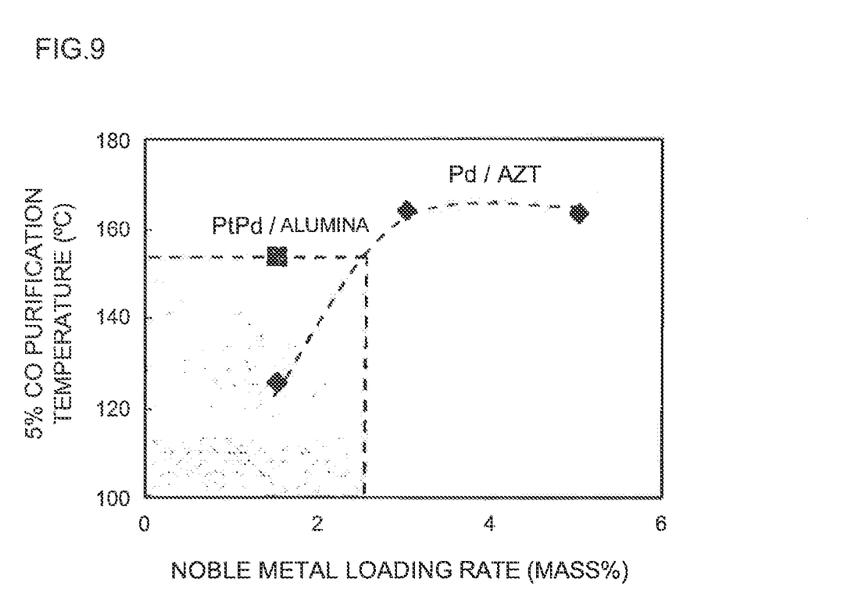
FIG. 9 is a diagram that shows the relationship between the noble metal loading rate and the low-temperature activity for CO purification for exhaust gas purification catalysts according to reference examples (vertical axis: 5% CO purification temperature (° C.), horizontal axis: noble metal loading rate (mass %))

As is shown by FIG. 9, a trend was observed in which, for the exhaust gas purification catalysts that used AZT complex oxide for the carrier, the CO purification performance in the low-temperature region declined as the amount of Pd particles supported increased. A comparison with the evaluation results for the exhaust gas purification catalyst according to Reference Example 4, which used $Al_2O_3$ for the carrier, demonstrated that an excellent CO purification performance was shown when the amount of Pd particles supported was less than or equal to about 2.5 mass % for the case in which the Pd particles were supported on the AZT complex oxide carrier (the second catalyst).

Figure 10:
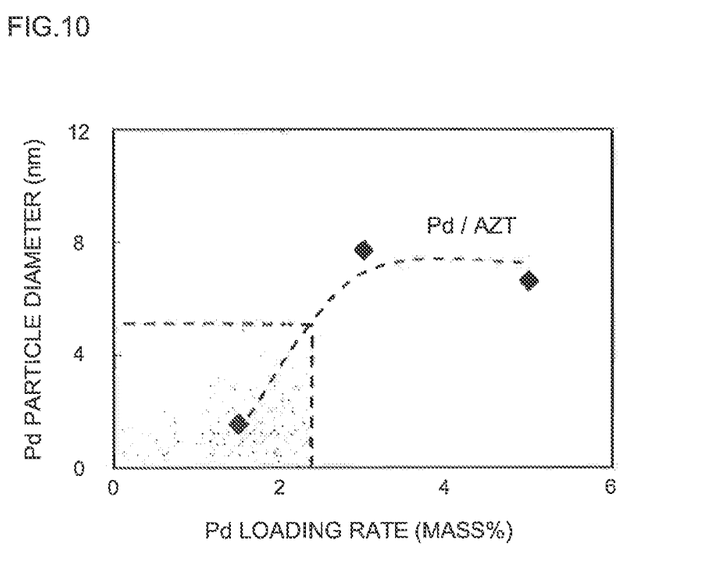
FIG. 10 is a diagram that shows the relationship between the Pd loading rate and the average particle diameter of the Pd particles for exhaust gas purification catalysts according to reference examples (vertical axis: Pd particle diameter (nm), horizontal axis: Pd loading rate (mass %))

In addition, the average particle size of the Pd particles was measured by the CO pulse adsorption method on the exhaust gas purification catalysts according to Reference Examples 2, 7, and 8. The results are given in FIG. 10. As is shown by FIG. 10, a trend was observed in which, for the exhaust gas purification catalysts that used AZT complex oxide for the carrier, the average particle diameter of the Pd particles increased as the amount of Pd particles supported increased. For an amount of Pd particles supported of less than or equal to about 2.5 mass %, it may be read from FIG. 10 that the average particle diameter of the Pd particles is less than or equal to about 5 nm. It is therefore recognized that an excellent CO purification performance is exhibited when the average particle diameter of the Pd particles supported on the AZT complex oxide is not more than 5 nm.

<Mixing Proportions Between the First Catalyst and the Second Catalyst>

In order to examine the suitable mixing proportions between the previously described catalyst that uses $Al_2O_3$ for the carrier (the first catalyst) and the previously described catalyst that uses AZT complex oxide for the carrier (the second catalyst), samples were prepared at different mixing proportions therebetween and the CO purification performance was evaluated.

Specifically, the following were prepared: a catalyst in which Pd particles were supported on the AZT complex oxide (the previously described Reference Example 2; the second catalyst); a catalyst in which Pt particles and Pd particles were supported on $Al_2O_3$ (the previously described Reference Example 4; the first catalyst); and an exhaust gas purification catalyst (Reference Example 10) in which the exhaust gas purification catalyst according to Reference Example 4 (the first catalyst) and the exhaust gas purification catalyst according to Reference Example 9 (the second catalyst) were mixed at 50% each as the mass ratio. The amount of Pt particles and/or Pd particles supported in Reference Examples 9 and 10 is as shown in Table 1. The previously described thermal challenge was run on this total of 3 species of exhaust gas purification catalysts (Reference Examples 2, 4, and 10) followed by execution of the previously described activity evaluation. The results are shown in FIG. 11.

Figure 11:
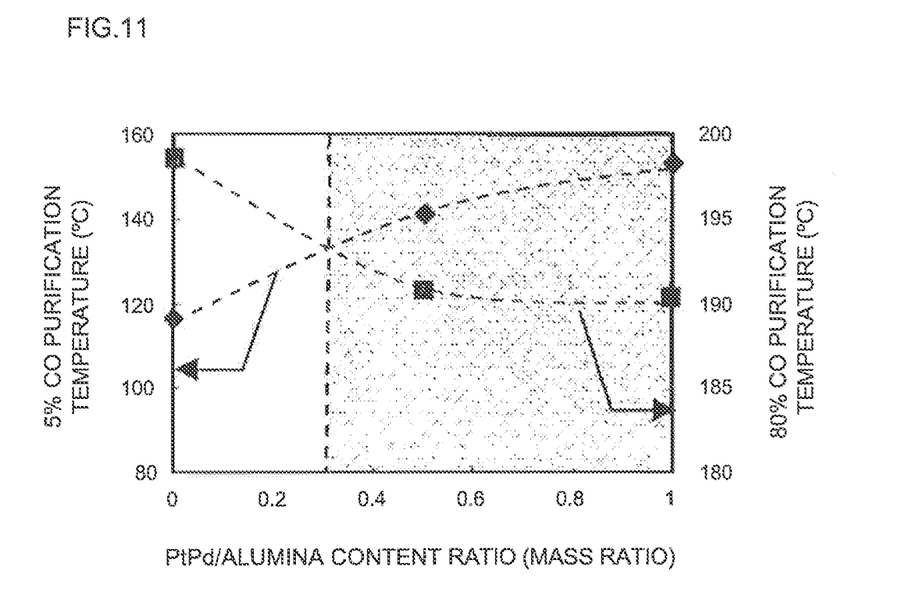
FIG. 11 is a diagram that shows the relationship between the mixing proportions of the first catalyst and the second catalyst and the CO purification performance for exhaust gas purification catalysts according to reference examples (vertical axis: 5% CO purification temperature (° C.) (left), 80% CO purification temperature (° C.) (right), horizontal axis: PtPd/alumina content ratio (mass ratio))

As is clear from FIG. 11, for the exhaust gas purification catalyst obtained by mixing the first catalyst with the second catalyst, conflicting trends are exhibited by the low-temperature activity for CO purification and the high-temperature activity for CO purification with respect to the variation in the content ratio of the first catalyst. Focusing here on the 80% CO purification temperature (i.e., the high-temperature activity), the high-temperature activity for CO purification is confirmed to be kept intact at a high level (i.e., a low 80% CO purification temperature) in the range in which the content ratio of the first catalyst is at least 50 mass %. Thus, as long as the first catalyst content ratio is about from at least 30 mass % to not more than 99 mass %, the CO purification performance of the catalyst provided by mixing the first catalyst and the second catalyst can be expected to be increased.

Exhaust gas purification catalysts according to an embodiment of the present invention were then prepared and their performance was evaluated.

Examples of the Production of the Exhaust Gas Purification Catalysts

Example 1

A noble metal particle-loaded powder in accordance with the first catalyst for use for the lower layer was first prepared. Thus, a dinitrodiammineplatinum nitrate solution in the appropriate amount to have a Pt content of 1.33 g, an aqueous palladium nitrate solution in the appropriate amount to have a Pd content of 0.67 g, and a suitable amount of pure water were mixed with 50 g $Al_2O_3$ powder ($\gamma$-$Al_2O_3$) as the carrier. The obtained liquid mixture was stirred for 2 hours and then dried at 130° C. and subsequently baked for 1 hour at 500° C. to produce a noble metal particle-loaded powder in accordance with the first catalyst for use for the lower layer.

A slurry for the lower layer was then produced using this noble metal particle-loaded powder for the lower layer. Specifically, a lower layer slurry was prepared by mixing 30 g BEA-type zeolite (Si/Al ratio=40), an aqueous aluminum nitrate solution that provided 17.5 g $Al_2O_3$ after baking as a binder component, and a suitable amount of pure water with the noble metal particle-loaded powder for the lower layer.

This slurry for the lower layer was then washcoated on the surface of a catalyst substrate. A cordierite honeycomb substrate (2 L capacity) was used as this catalyst substrate. Coating was followed by drying under ventilation and then by baking for 1 hour at 500° C. to form the lower layer of the exhaust gas purification catalyst.

A noble metal particle-loaded powder in accordance with the first catalyst for use for the upper layer was prepared. Thus, a dinitrodiammineplatinum nitrate solution in the appropriate amount to have a Pt content of 0.58 g, an aqueous palladium nitrate solution in the appropriate amount to have a Pd content of 0.29 g, and a suitable amount of pure water were mixed with 12.5 g $Al_2O_3$ powder ($\gamma$-$Al_2O_3$) as the carrier. The obtained liquid mixture was stirred for 2 hours and then dried at 130° C. and subsequently baked for 1 hour at 500° C. to produce a noble metal particle-loaded powder in accordance with the first catalyst for use for the upper layer.

A noble metal particle-loaded powder in accordance with the second catalyst for use for the upper layer was prepared by the same procedure. Thus, an aqueous palladium nitrate solution in an appropriate amount to have a Pd content of 0.13 g and a suitable amount of pure water were mixed with 12.5 g of an AZT complex oxide powder as the carrier. Drying and baking under the same conditions as above produced a noble metal particle-loaded powder in accordance with the second catalyst for use for the upper layer.

A slurry for the upper layer was then produced using these noble metal particle-loaded powders in accordance with the first catalyst and the second catalyst for use for the upper layer. Specifically, an upper layer slurry was prepared by mixing 60 g BEA-type zeolite (Si/Al ratio=40), an aqueous aluminum nitrate solution that provided 17.5 g $Al_2O_3$ after baking as a binder, and a suitable amount of pure water with the noble metal particle-loaded powders (mixture of the first catalyst and the second catalyst) for the upper layer.

This slurry for the upper layer was then washcoated on the surface of the substrate on which the lower layer had already been formed. Coating was followed by drying under ventilation and then by baking for 1 hour at 500° C. to form the upper layer of the exhaust gas purification catalyst.

The exhaust gas purification catalyst produced by this sequence of processes is designated as the exhaust gas purification catalyst according to Example 1.

Examples 2 and 3 and Comparative Examples 1 and 2

Exhaust gas purification catalysts according to Examples 2 and 3 and Comparative Examples 1 and 2 were prepared in accordance with the production process for the exhaust gas purification catalyst according to Example 1. The constituent component ratio (g/substrate-L) in these exhaust gas purification catalysts and the layer thickness of each layer are given in Table 4. The amount of noble metal supported in each exhaust gas purification catalyst as a whole was set at 3 g/L.

[Table 4]

TABLE 4

| | | | Comp. Ex. 1 | Comp. Ex. 2 | Example 1 | Example 2 | Example 3 |
|---|---|---|---|---|---|---|---|
| upper layer (g/L) | first catalyst | Pt | 0.67 | 0 | 0.58 | 0.58 | 0.58 |
| | | Pd | 0.33 | 0 | 0.29 | 0.29 | 0.29 |
| | | $Al_2O_3$ | 25 | 0 | 12.5 | 12.5 | 12.5 |
| | second catalyst | Pt | 0 | 0.67 | 0 | 0 | 0 |
| | | Pd | 0 | 0.33 | 0.13 | 0.13 | 0.13 |
| | | AZT | 0 | 25 | 12.5 | 12.5 | 12.5 |
| | zeolite | | 60 | 60 | 60 | 60 | 60 |
| | binder* | | 17.5 | 17.5 | 17.5 | 17.5 | 17.5 |
| upper layer thickness (μm) | | | 60 | 50 | 55 | 56 | 55 |

TABLE 4-continued

| | | | Comp. Ex. 1 | Comp. Ex. 2 | Example 1 | Example 2 | Example 3 |
|---|---|---|---|---|---|---|---|
| lower layer (g/L) | first catalyst | Pt | 1.33 | 0 | 1.33 | 1.17 | 1.17 |
| | | Pd | 0.67 | 0 | 0.67 | 0.58 | 0.58 |
| | | $Al_2O_3$ | 80 | 0 | 50 | 55 | 25 |
| | second catalyst | Pt | 0 | 1.67 | 0 | 0 | 0 |
| | | Pd | 0 | 0.67 | 0 | 0.25 | 0.25 |
| | | AZT | 0 | 80 | 0 | 25 | 25 |
| | zeolite | | 0 | 0 | 30 | 0 | 30 |
| | binder* | | 17.5 | 17.5 | 17.5 | 17.5 | 17.5 |
| lower layer thickness (μm) | | | 130 | 120 | 120 | 115 | 110 |

*The binder content was calculated using the mass provided by conversion to alumina.

The compositional ratios (mass %) for the materials present in the overall exhaust gas purification catalysts according to Examples 1 to 3 and Comparative Examples 1 and 2 are given in Table 5.

TABLE 5

| | material compositional ratio (mass %) | | | |
|---|---|---|---|---|
| | akimina | zirconia | titania | silica |
| Comparative Example 1 | 71.2 | 0 | 0 | 28.8 |
| Comparative Example 2 | 50.2 | 14.7 | 6.3 | 28.8 |
| Example 1 | 54.3 | 1.8 | 0.8 | 43.2 |
| Example 2 | 63.7 | 5.3 | 2.3 | 28.8 |
| Example 3 | 49.3 | 5.3 | 23 | 43.2 |

<Thermal Challenge on the Exhaust Gas Purification Catalysts According to the Examples and Comparative Examples>

A simple thermal challenge was performed on the exhaust gas purification catalysts according to Examples 1 to 3 and Comparative Examples 1 and 2 using an electric furnace and heating in the air at 750° C. for 37 hours.

<Sulfur Poisoning of the Exhaust Gas Purification Catalysts According to the Examples and Comparative Examples>

Using a 2.2-L diesel engine bench and a fuel that contained 350 ppm sulfur component, sulfur poisoning was carried out on the exhaust gas purification catalysts that had been subjected to the thermal challenge. An inlet gas temperature at the catalyst of 400° C. was used. For the amount of sulfur, 10 g per exhaust gas purification catalyst was passed through.

<Evaluation of the Purification Performance>

Figure 12:
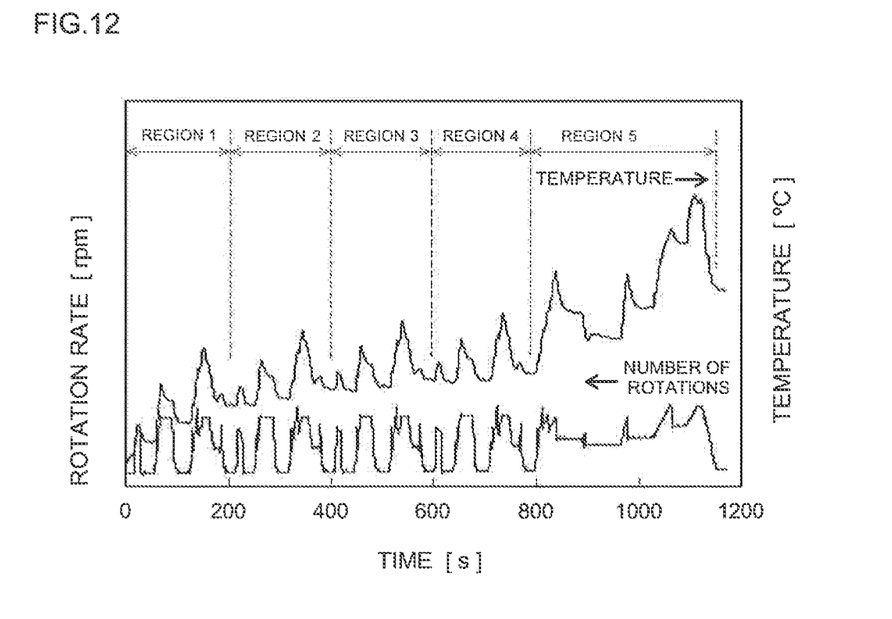
FIG. 12 is a diagram that shows an outline of the New European Driving Cycle (NEDC) mode used to evaluate the exhaust gas purification performance of the exhaust gas purification catalysts of the examples (vertical axis: rotation rate (rpm) (left), temperature (° C.) (right), horizontal axis: time (sec))

Using the exhaust gas from a 2.2-L diesel engine, the exhaust gas purification performance was evaluated on the exhaust gas purification catalysts according to the examples and comparative examples, both after the thermal challenge and after the sulfur poisoning treatment carried out after the thermal challenge. The New European Driving Cycle (NEDC) mode (refer to FIG. 12) was reproduced using the diesel engine. In addition, as a pretreatment, a regeneration treatment was performed by combustion of the particulate matter (PM) by bringing the catalyst bed temperature to 600° C. for 5 minutes.

Figure 13:
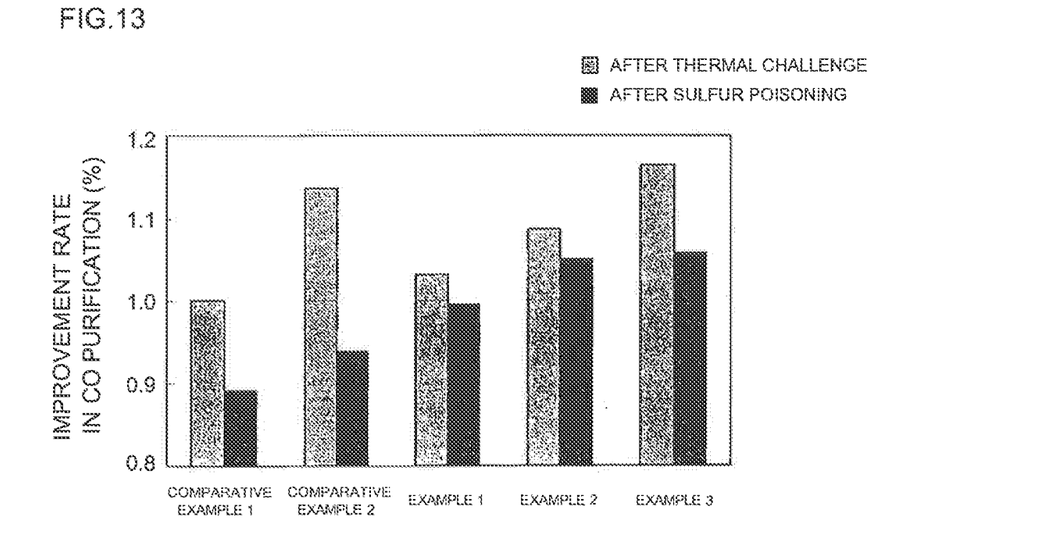
FIG. 13 is a diagram that shows the evaluation results for exhaust gas purification catalysts according to several examples and comparative examples, where the vertical axis shows the improvement rate in CO purification based on the CO purification rate after thermal challenge in Comparative Example 1 (vertical axis: improvement rate in CO purification (%)).

The results of this purification performance evaluation are shown in FIG. 13. As is clear from FIG. 13, the exhaust gas purification catalysts according to Comparative Examples 1 and 2 presented a substantial decline in CO purification performance due to the sulfur poisoning treatment after the thermal challenge. In the case of the exhaust gas purification catalysts according to Examples 1 to 3, on the other hand, there was little decline in the CO purification performance from after the thermal challenge to after the sulfur poisoning treatment, and in particular the CO purification performance post-sulfur poisoning was excellent for the exhaust gas purification catalysts according to Examples 2 and 3.

INDUSTRIAL APPLICABILITY

The present invention can provide an exhaust gas purification catalyst that has an excellent purification performance for carbon monoxide (CO) even under low-temperature conditions.

The invention claimed is:

1. An exhaust gas purification catalyst comprising a substrate, a lower layer disposed on the substrate, and an upper layer disposed on the lower layer, wherein
    a first catalyst has $Al_2O_3$ as a carrier and has Pt and Pd supported as noble metals on the $Al_2O_3$;
    a second catalyst has either of an $Al_2O_3$—$ZrO_2$ complex oxide or an $Al_2O_3$—$ZrO_2$—$TiO_2$ complex oxide as a carrier and has Pd supported as a noble metal on either of the $Al_2O_3$—$ZrO_2$ complex oxide or the $Al_2O_3$—$ZrO_2$—$TiO_2$ complex oxide;
    the upper layer is provided with the first catalyst and the second catalyst;
    the lower layer is provided with the first catalyst; and
    the upper layer is provided with a zeolite.

2. The exhaust gas purification catalyst according to claim 1, wherein the Pd loading rate in the second catalyst is not more than 2.5 mass %, when the carrier of either of an $Al_2O_3$—$ZrO_2$ complex oxide or an $Al_2O_3$—$ZrO_2$—$TiO_2$ complex oxide is at 100 mass %.

3. The exhaust gas purification catalyst according to claim 1, wherein, for the upper layer, the content of the first catalyst is from at least 30 mass % to not more than 99 mass % when the total of the first catalyst and the second catalyst is 100 mass %.

4. The exhaust gas purification catalyst according to claim 1, wherein the lower layer is additionally provided with the second catalyst.

5. The exhaust gas purification catalyst according to claim 4, wherein, for the lower layer, the content of the first catalyst is from at least 30 mass % to not more than 99 mass % when the total of the first catalyst and the second catalyst is 100 mass %.

6. The exhaust gas purification catalyst according to claim 1, wherein the lower layer is additionally provided with a zeolite.

7. The exhaust gas purification catalyst according to claim 1, wherein the average particle size of the noble metal supported in the second catalyst is not more than 5 nm.

8. The exhaust gas purification catalyst according to claim 1, wherein the upper layer is provided with zeolite particles as the zeolite.

9. The exhaust gas purification catalyst according to claim 1, used for the purification of an exhaust gas from a diesel engine.

* * * * *